US008909744B2

United States Patent
Rathore et al.

(10) Patent No.: US 8,909,744 B2
(45) Date of Patent: Dec. 9, 2014

(54) SYSTEM AND METHOD FOR TRANSITIONING TO CLOUD COMPUTING ENVIRONMENT

(75) Inventors: Rupak Rathore, Noida (IN); Sumeet Jain, Delhi (IN); Dharmender Kapoor, Faridabad (IN)

(73) Assignee: HCL Technologies Limited (IN)

( * ) Notice: Subject to any disclaimer, the term of this patent is extended or adjusted under 35 U.S.C. 154(b) by 541 days.

(21) Appl. No.: 13/276,743

(22) Filed: Oct. 19, 2011

(65) Prior Publication Data

US 2012/0102193 A1     Apr. 26, 2012

(51) Int. Cl.
*G06F 15/16*     (2006.01)
*G06F 9/06*     (2006.01)
*G06Q 10/00*     (2012.01)

(52) U.S. Cl.
CPC . *G06Q 10/00* (2013.01); *G06F 9/06* (2013.01)
USPC ............................. 709/220; 709/224; 709/226

(58) Field of Classification Search
CPC .................. H04L 29/08072; H04L 29/08144; H04L 29/04
USPC ......................................... 709/220, 226, 228
See application file for complete search history.

(56) References Cited

U.S. PATENT DOCUMENTS

| | | | |
|---|---|---|---|
| 7,774,363 B2 * | 8/2010 | Lim | 707/781 |
| 8,695,090 B2 * | 4/2014 | Barile et al. | 726/22 |
| 2009/0276771 A1 | 11/2009 | Nickolov et al. | |
| 2010/0042720 A1 | 2/2010 | Stienhans et al. | |
| 2010/0125473 A1 | 5/2010 | Tung et al. | |
| 2011/0055398 A1 * | 3/2011 | Dehaan et al. | 709/226 |
| 2011/0138047 A1 * | 6/2011 | Brown et al. | 709/226 |

* cited by examiner

*Primary Examiner* — Khanh Dinh
(74) *Attorney, Agent, or Firm* — Finnegan, Henderson, Farabow, Garrett & Dunner, L.L.P.

(57) ABSTRACT

System and method for assessing the transitioning of computing components to a cloud computing environment is described. The system and method comprises of identifying at least one category of service in an organization to be transitioned to a cloud computing environment; collecting relevant information about the category from one or more service category owners and/or users; analyzing the information received based on pre-defined parameters; and classifying the services into high cloud ready, moderate cloud ready, or limited cloud ready based on the analyzed information.

15 Claims, 5 Drawing Sheets ously poor resource utilization. For example, it is not
SYSTEM AND METHOD FOR TRANSITIONING TO CLOUD COMPUTING ENVIRONMENT

CROSS-REFERENCE TO RELATED APPLICATIONS

This U.S. patent applications claims the benefits of priority to Indian Patent Application No. 3105/CHE/2010, filed on Oct. 20, 2010, the entirety of which is incorporated herein by reference.

TECHNICAL FIELD

Embodiments of the present disclosure relate to a system and method for assessing the transitioning of computing components/service categories to a cloud computing environment and more particularly for determining the transition of organization applications to a cloud computing environment.

BACKGROUND

Traditional data centers tend to run a single operating system instance and a single business application on one physical server. This "one server, one appliance" model leads to extremely poor resource utilization. For example, it is not uncommon for a significant portion of data center resources to be unused for a majority of the data center's "up" time. Wasted resources include CPU, RAM, Storage, and Network Bandwidth. Additionally, many traditional data centers are typically implemented by combining a heterogeneous mix of different servers, operating systems, applications and data. Consequently, deploying, managing, and reconfiguring software or hardware on physical servers and the data center's network infrastructure is mostly achieved via manual (e.g., human) labor, and it typically very time consuming. Additionally, in such data centers, the upgrading of servers typically involves a relatively slow and costly process. Further, in situations where workloads grow more rapidly than expected and place heavy demands on server resources, such traditional data centers face the problem of over-utilizing their servers, which may result in business continuity being placed at risk.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce or all together eliminate disruption due to an application or hardware failure.

In general, the concept of "cloud computing" refers to the utilization of a set of shared computing resources (e.g., servers) which are typically consolidated in one or more data center locations. A cloud-based computing resource is thought to execute or reside somewhere on the "cloud", which may be an internal corporate network or the public Internet. From the perspective of an application developer or information technology administrator, cloud computing enables the development and deployment of applications that exhibit scalability (e.g., easily and dynamically increase or decrease resource utilization as needed), performance (e.g., execute efficiently and fast), and reliability (e.g., never, or at least rarely, fail), all without any regard for the nature or location of the underlying infrastructure.

A cloud computing implementation of a software application allows an organization to access the application through the Internet without knowledge of, expertise with, or control over the technology infrastructure supporting the application. Cloud computing provides many benefits over traditional infrastructure models where compute equipment is owned or leased and housed in a server room, data center, or collocation site, such as on-demand procurement, reduced cost, increased capability in terms of compute and storage, flexibility and application mobility. For example, applications may be provided that are accessible from a web browser, while the application software and data are centrally stored. Cloud computing may add complexity over traditional infrastructure models in terms of regulation compliance and controllability; organizations may have difficulty determining the trade-off between the benefits and the complexity.

There are various systems and methods devised for assessing the transitioning of computing components/service categories to a cloud computing environment as mentioned below.

US 2010/0042720 includes a multi-cloud management module having a plurality of cloud adapters. The multi-cloud management module provides a unified administrative interface for provisioning cloud-based resources on any one of several clouds for which a cloud adapter is configured for use with the multi-cloud management module. Each cloud adapter converts non-cloud-specific commands to cloud-specific provisioning commands for the cloud to which the cloud adapter is associated.

US 2010/0125473 discloses a system for providing a cloud computing assessment tool. The system may include a memory, an interface, and a processor. The processor may receive a data center configuration from the user. The data center configuration may include a compute and storage capacity. The processor may determine a cloud computing configuration equivalent to the data center configuration. The processor may identify a time period for transitioning from the data center to cloud computing. The processor may identify a plurality of trend values representing changes in the compute capacity and storage capacity over the period of time. The processor may generate a strategy to transition from the data center to cloud computing over the period of time. The strategy may account for the changes in the compute capacity and the storage capacity. The processor may provide a graphical output and a numerical output of the strategy to the user.

US 2009/0276771 discloses on-demand, grid and/or utility computing networks. Examples of at least a portion of the techniques (and/or related features, aspects, and/or benefits) disclosed herein include: techniques for migrating virtual appliances from a first server grid to a second server grid via a communication network; techniques for migrating distributed applications from a first server grid to a second server grid via a communication network; techniques for delivering pre-packaged software in virtual appliances to computing systems for use in operating software applications; techniques for managing use of virtualized computing resources implemented in a computing network; exchange systems for renting or leasing computing resources provided over a computing network; techniques for offering, via a computing network, virtualized computing resources for use in deployment of one or more distributed applications at one or more server grids of a computing network; techniques for offering, via a computing network, distributed application components for use in deployment of one or more distributed applications at one or more server grids of a computing network; techniques for implementing exchange of computing resources between computing resource providers and computing resource subscribers of a computing network; and the like. In at least one embodiment, the computing network may include multiple different data centers and/or server grids which are deployed different geographic locations. In at least one embodiment, at least some of the server grids may be operable to provide on-demand, grid and/or utility computing resources for hosting various types of distributed applications. In at least one embodiment, a distributed application may be characterized as an application made up of distinct components (e.g., virtual appliances, virtual machines, virtual interfaces, virtual volumes, virtual network connections, etc.) in separate runtime environments. In at least one embodiment, different ones of the distinct components of the distributed application may be hosted or deployed on different platforms (e.g., different servers) connected via a network. In some embodiments, a distributed application may be characterized as an application that runs on two or more networked computers.

However, above-mentioned systems and methods do not provide a unique, fast, efficient, highly automated and comprehensive framework which provides for very high level of parameterization at each level that are useful in aligning with the organization's imperatives, business needs and business demands. The afore-mentioned problems are solved by embodiments disclosed herein.

OBJECTS AND SUMMARY

An embodiment of the present disclosure provides a system and method for assessing the transitioning of computing components/service categories to a cloud computing environment.

Another embodiment of the present disclosure provides a system and method for determining the transition of organization applications to a cloud computing environment.

A further embodiment of the present disclosure determines the cloud computing provider for the organization.

In another embodiment, the present disclosure provides a very high level of parameterization at each level of transitioning to the cloud computing environment.

To achieve the aforementioned, the present disclosure provides a method for determining a transition to a cloud computing environment, said method comprising the steps of:
 identifying at least one category of service in an organization to be transitioned to a cloud computing environment;
 collecting relevant information about the category from one or more service category owners and/or users;
 analyzing the information received based on pre-defined parameters; and
 classifying the services into high cloud ready, moderate cloud ready or limited cloud ready based on the analyzed information.

The present disclosure further provides a system for determining a transition to a cloud computing environment, said system comprising:
 means for identifying at least one category of service in an organization to be transitioned to a cloud computing environment;
 means for collecting relevant information about the category from one or more service category owners and/or users;
 means for analyzing the information received based on pre-defined parameters; and
 means for classifying the services into high cloud ready, moderate cloud ready, or limited cloud ready based on the analyzed information.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

System and method for assessing the transitioning of computing components/service categories to a cloud computing environment is described. The system and method is not intended to be restricted to any particular form or arrangement, or any specific embodiment, or any specific use, disclosed herein, since the same may be modified in various particulars or relations without departing from the spirit or scope of the claimed invention herein shown and described. The system and/or method shown is intended only for illustration and disclosure of an operative embodiment and not to show all of the various forms or modifications in which this invention might be embodied or operated.

Embodiments of the present disclosure provide a system and method for assessing the transitioning of computing components/service categories in an organization to a cloud computing environment. The service categories can be infrastructure, applications or software. The cloud computing environment can be based on IaaS (Infrastructure as a service), PaaS (Application or Platform as a service), SaaS (Software as a Service). The instant disclosure provides for very high degree of parameterization at each level of the system for transitioning to cloud computing environment. There are many factors such as CRI (cloud readiness score) score, risk scores and value scores of the computing components based on which the method determines the most suitable cloud computing type, cloud provider and cloud scenario for the organization. The method also determines the capability of the computing components to be moved to the cloud type, provider and scenario.

The techniques described herein may be used in many different operating environments and systems. An exemplary environment that is suitable for practicing various implementations is discussed in the following section with respect to the accompanying figures.

Exemplary System

Figure 1:
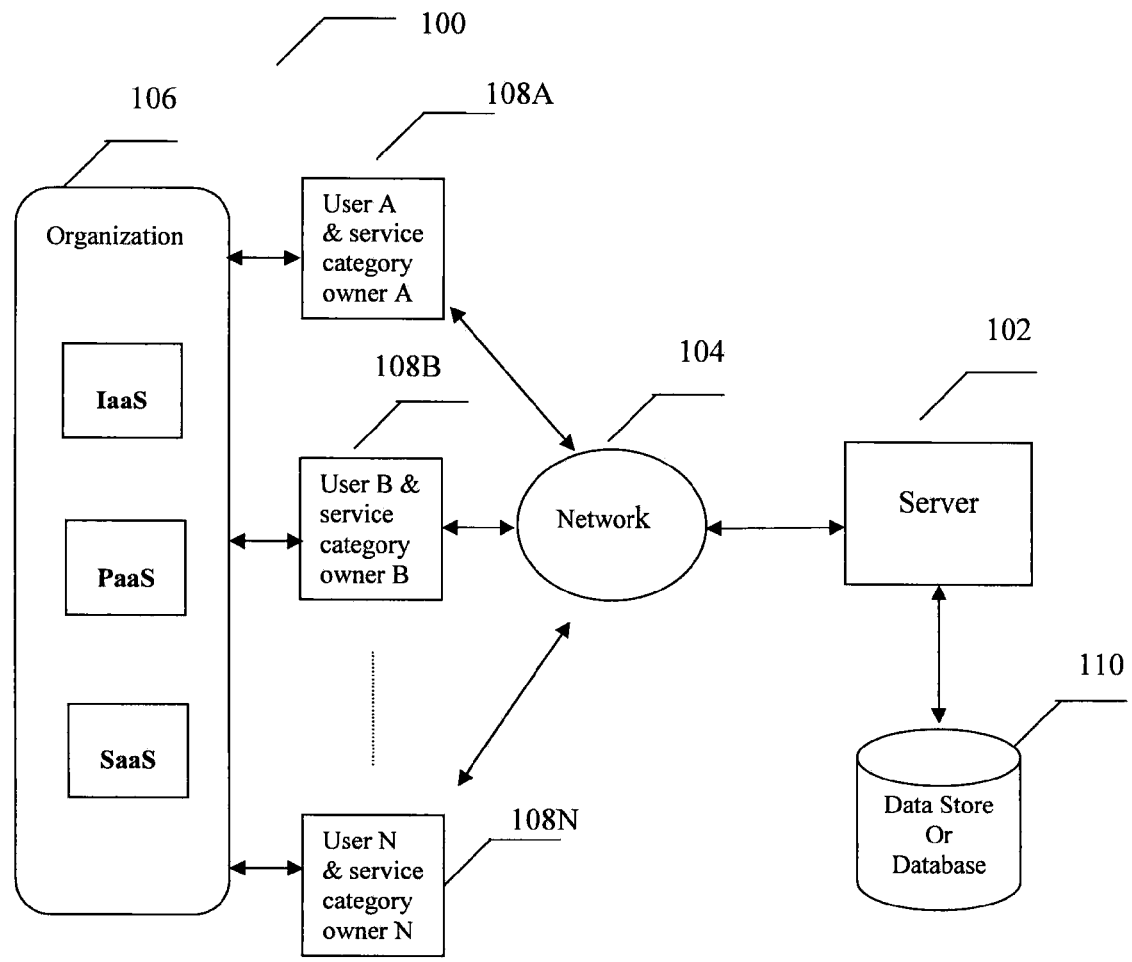
FIG. 1 is an exemplary system illustrating the network diagram of the cloud computing assessment tool according to the present disclosure.

FIG. 1 is an exemplary system illustrating the network diagram of the cloud computing assessment tool according to an embodiment of the present disclosure. According to an embodiment of the instant disclosure, the system and method provides a technique for transitioning the organization applications to the cloud computing environment by implementing IaaS, PaaS or SaaS as a cloud model.

Figure 2:
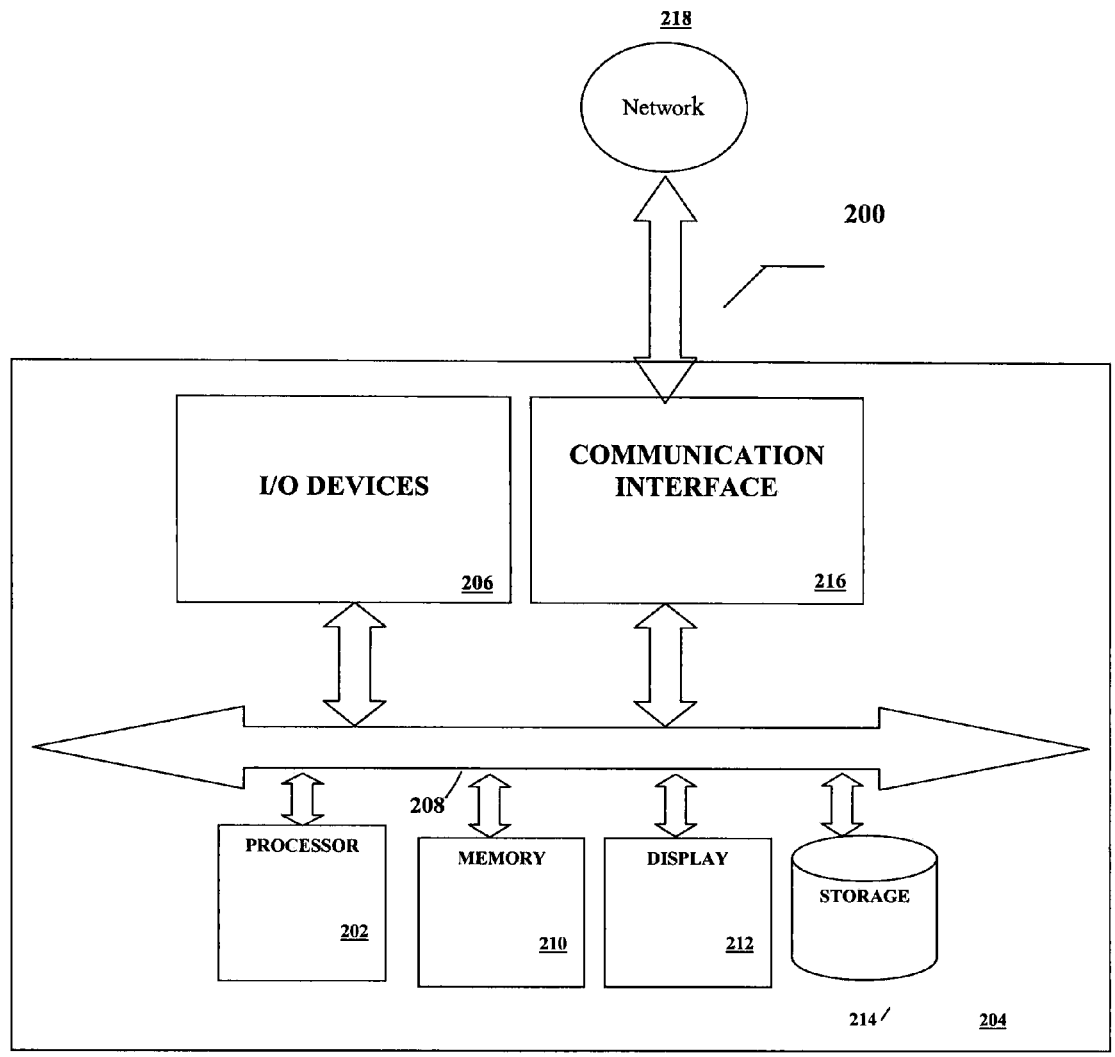
FIG. 2 is an illustration of general purpose computer system used in a cloud computing assessment tool according to the present disclosure.

The network environment 100 can include a server 102 comprising a database 110, network 104, service categories 106 in an organization which can be transitioned to either of cloud computing model as mentioned in the diagram, one or more users and/or service category owners 108A-N of the organization. The server 102 can interact with the users and/or service category owners 108A-N of the organization 106 through the network 104 for devising a transition strategy for the organization to the cloud computing environment. It provides a questionnaire to the users and/or owners as front end applications through the network 104. The server 102 can include application server, an infrastructure or data center server and software server depending upon the type of service to be deployed in the organization. The server 102 can be a general purpose computer system as illustrated in FIG. 2. The network 104 can include wide area network such as internet, local area network, wireless network or any other network that can allow data communication. The networks can be public or private network connection and can deploy any of the security features such as firewall, encryption etc. The database 110 can be any relational, hierarchical or network database. The users 108A-N workstations can be a general purpose computer system as depicted in FIG. 2.

FIG. 2 is an illustration of general purpose computer system used in a cloud computing assessment tool according to an embodiment of the present disclosure.

The computer system 200 can operate as a standalone device or may be connected, e.g., using a network, to other computer systems or peripheral devices. In a networked deployment, the computer system can operate in the capacity of a server or as a client user computer in a server-client user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device. It can also be implemented using electronic devices that provide voice, video or data communication.

The computer system 200 can include a processor 202, such as, a central processing unit (CPU), a graphics processing unit (GPU), or both. The processor 200 can be one or more general processors, digital signal processors, application specific integrated circuits, field programmable gate arrays, servers, networks, digital circuits, analog circuits, combinations thereof, or other now known or later developed devices for analyzing and processing data.

The computer system 200 can include a memory 210 that can communicate via a bus 208. The memory 210 can be a main memory, a static memory, or a dynamic memory. The memory 210 can include various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 210 may include a cache or random access memory for the processor 202. The memory 210 can be an external storage device 214 or database for storing data and can include a hard drive, compact disc ("CD"), digital video disc ("DVD"), memory card, memory stick, floppy disc, universal serial bus ("USB") memory device, or any other device operative to store data. The memory 210 can be operable to store instructions executable by the processor 202. The processing strategies can include multiprocessing, multitasking, parallel processing and the like.

The computer system 200 can further include a display 212, such as a liquid crystal display (LCD), an organic light emitting diode (OLED), a flat panel display, a solid state display, a cathode ray tube (CRT), a projector, a printer or other now known or later developed display device for outputting determined information. Additionally, the computer system 200 can include an input/output device 206 configured to allow a user to interact with any of the components of system. The input device 206 may be a number pad, a keyboard, or a cursor control device, such as a mouse, or a joystick, touch screen display, remote control or any other device operative to interact with the system.

The computer system 200 can include a communication interface 216 for transmitting or receiving the instructions over the network 218. The communication interface 216 can be a part of the processor 202 or can be a separate component. The communication interface can be created in software or may be a physical connection in hardware. The communication interface 216 can be configured to connect with a network 218, external media, the display 212, or any other components in system 200, or combinations thereof. The connection with the network 218 can be a physical connection, such as a wired Ethernet connection or may be established wirelessly. In the case of a server 102, the server can communicate with users 108A-N through the communication interface 216.

Exemplary Method

Figure 3:
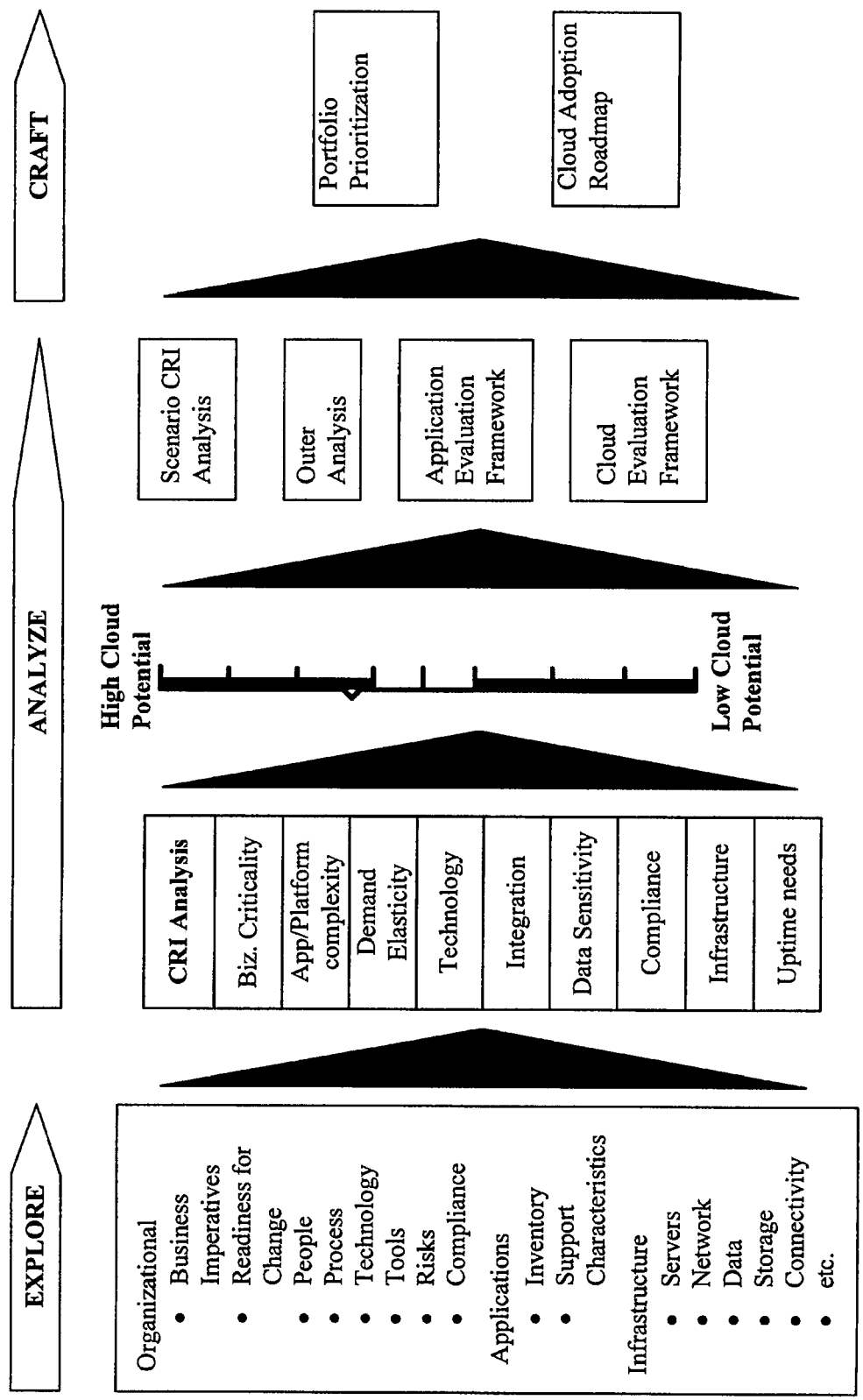
FIG. 3 is an exemplary method indicating the three phases for transitioning to a cloud computing infrastructure according to the present disclosure.

FIG. 3 is an exemplary method indicating the three phases for transitioning to a cloud computing infrastructure according to an embodiment of the present disclosure.

The first phase is explore phase which involves collection of Data/Information about the category of service from the one or more users and service category owners of the organization. The information can be organization's business imperatives, people, processes, technologies, tools, risks, compliance, application's inventory, support characteristics, infrastructure such as servers, network, data storage and connectivity. The collection of data depends upon the cloud computing environment to be implemented as explained above.

The second phase is analyze phase which can be based on parameters like Business Criticality of Application, Application/Platform Complexity, Demand Elasticity, Technology etc. The user or service category owner is provided with a questionnaire by the server. The questionnaire comprises of questions based on the characteristics of the computing components, for example, application characteristics. The questions can be used to determine the environment of the computing component, the operating system used by the computing component etc. The assessment is done by the server 102 in a mathematical manner as defined below.

1. Let A be a set of application characteristics, thus A={$A_1, A_2, \ldots, A_n$}
2. Let E be a target cloud environment characteristics, thus E={$E_1, E_2, \ldots, E_n$}
3. Then, Scores (CRI, Risk and Value) $\mathcal{R}$ (A, E) of an Application A for a target cloud environment E is defined as $$\mathcal{R}(A, E) = \left(\frac{\sum_{i=1}^{n} w_i \mathcal{P}_i}{\sum_{i=1}^{n} w_i}\right) \times \min(\bar{v}(\mathcal{P}_i)) + \min\left(\prod_{i=1}^{n} v(\mathcal{P}_i), 10\right) \quad \text{equation (i)}$$

Where
a. $\bar{v}(\mathcal{P}_{i,i})$ is equal to non-linear function returning 0 or 1
b. $\bar{v}(\mathcal{P}_{i,i})$ is defined as
  01. $\bar{v}(\mathcal{P}_{i,i})=0 \Rightarrow \Rightarrow (\mathcal{P}_{i,t})=0$ or 10 depending on E
  02. $\bar{v}(\mathcal{P}_{i,i})=1 \, v \, v \, (\mathcal{P}_{i,t})=0$
c. $w_i$ is the weight of a parameter
d.

$$\mathcal{P}_i \text{ is defined as } \mathcal{P}_i = \frac{\sum_{j=1}^{m} w_j v_j}{\sum_{j=1}^{m} w_j} \quad \text{equation (ii)}$$

e. $w_j$ is the weight of a question having the value of $v_j$
f. $v_j = v_{jb} + f(A) + f(E) + f(A,E)$     equation (iii)
g. $v_{jb}$ is baseline benchmark for the given organization for application characteristic $A_j$ 4. Let $\mathcal{L}(E)$ be the lower threshold for the given set of applications.

5. $\mathcal{L}(E) = \mathcal{R}(A\mathcal{L}, E)$     equation (iv)

a. where $A\mathcal{L}$ represents ideal application to be kept in house for the organization 6. Let $\mathcal{U}(E)$ be the upper threshold for the given set of applications.

7. $\mathcal{U}(E) = \mathcal{R}(A\mathcal{U}, E)$     equation (v)

a. where $A\mathcal{U}$ represents ideal application to be moved to cloud for the organization 8. An application's readiness can thus be compared to lower threshold $\mathcal{L}(E)$ and upper threshold $\mathcal{U}(E)$ for the given set of applications.

9. Let C be the set of applications in an organization, then
  a. $C_H$ is the set of applications with high CRI Scores, high Value scores and low Risk score.
     CRI Score and Value score defined as $C_H = \forall C_i \epsilon C: \mathcal{U}(E) \le \mathcal{R}(A_{C_i}, E) < 10$     equation (vi)

Risk score defined as $C_H = \forall C_i \epsilon C: 0.5 \le \mathcal{R}(A_{C_i}, E) < L(E)$     equation (vii)

b. $C_M$ is the set of applications with moderate CRI Scores, moderate Value scores and moderate Risk scores
     CRI score, Risk Score and Value Score defined as $C_M = \forall C_i \epsilon C: \mathcal{L}(E) \le \mathcal{R}(A_{C_i}, E) < U(E)$     equation (viii)

c. $C_L$ is the set of applications with limited CRI Scores, limited Value scores and high Risk Score
     CRI Score and Value score defined as $C_L = \forall C_i \epsilon C: 0.5 \le \mathcal{R}(A_{C_i}, E) < L(E)$     equation (ix)

Risk score defined as $C_L = \forall C_i \epsilon C: \mathcal{U}(E) \le \mathcal{R}(A_{C_i}, E) < 10$     equation (x)

d. And $C = \{C_V, C_H, C_M, C_L, C_Z\}$     equation (xi)

10.    $\mathcal{R}(A_{C_i}, E) \mathcal{U}(E) \le \mathcal{R}(A_{C_i}, E) < \mathcal{L}(E) \le \mathcal{R}(A_{C_i}, E) < U(E) \ldots$ equation (viii) $0.5 \le \mathcal{R}(A_{C_i}, E) < L(E) \ldots$ equation (ix) $\mathcal{R}(A_{C_i}, E)$. Let S be the set of cloud computing environment scenarios being evaluated in an organization, then for a given $S_i$, E would reflect characteristics of $S_i$ and thus it can derived that a. $C_V, C_H, C_M, C_L, C_Z$ is a function of $S_i$, leading to $|C_v| + |C_H| - |C_z| = g(S_i)$     equation (xii)

b. From equation (xii), it can be derived that $S_i = h(C)$     equation (xiii)

11. From equation (xiii), equation (i) and equations (vi) ... (xi), it can be derived that $S_i = h'(P_i)$     equation (xiv)

12. From equation (xiv), we can derive the top n parameters exercising maximum influence on CRI score, Risk Score and Value Score for a given scenario of the organization. This enables to remediate the negative influence caused by these parameters.

The values of A and E above are established using a limited set of options for each $A_i$ and $E_i$. Each answer option has a dynamic value depending on target cloud environment and application characteristics as defined in equation (iii) above. Each question also has a dynamic weight and defaults to be applied in the absence of valid datum. A pre-defined set of questions are evaluated together as a parameter as per equation (ii). Veto calculations are performed as given in 3(a) and 3(b) above to obtain the correct polarity and extent of influence. The CRI scores, Value scores and Risk scores can then be calculated as per equation (i) above. The CRI Score, Risk Score and Value score is then compared with the dynamic lower and dynamic upper threshold values to arrive at the appropriate readiness for an application and classify it amongst high cloud ready applications, moderate cloud ready applications and limited cloud ready applications. as defined in equations (vi) ... (xi). These thresholds are dynamic in nature as defined as equation (iv) and (v). Additionally, the method used can help in detailed analysis of underlying parameters to segregate the top n (2 to 5) parameters having the maximum influence as per equations (xii) ... (xiv).

Thereafter, cloud evaluation framework is designed using equations (vi) ... (xiv) to map the applications to a cloud computing environment and further to define the degree of ownership of the cloud applications based on the type of cloud model which can be private, public, hybrid or community cloud.

The third phase is craft phase in which a roadmap for cloud adoption is defined as per the output of the analyze phase.

Figure 4:
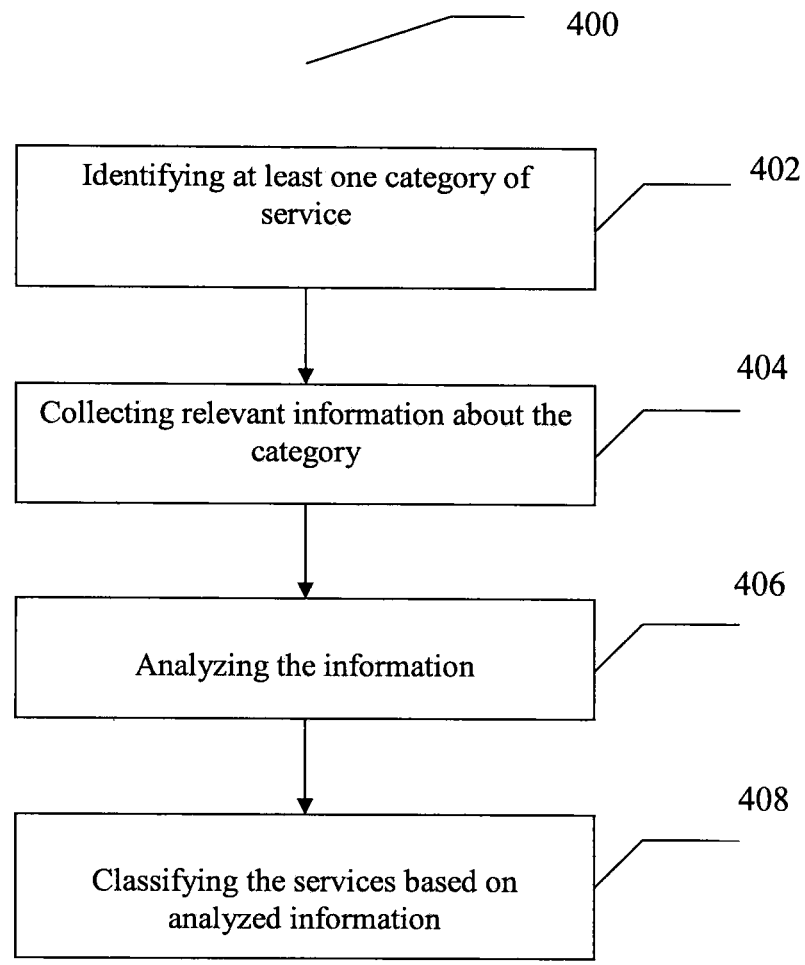
FIG. 4 is an exemplary flowchart illustrating a method of transitioning to a cloud computing environment according to the present disclosure.

FIG. 4 is an exemplary flowchart 400 illustrating a method of transitioning to a cloud computing environment according to an embodiment of the present disclosure.

At 402, the category of service is identified that can be transitioned to a cloud computing environment. This is determined as per organization imperatives and business needs.

At 404, the information about the service is collected from the users and/or service category owners through a questionnaire as explained above in FIG. 3.

At 406, the collected information is analyzed based on pre-defined parameters. The analysis or assessment is done in a mathematical manner as explained above.

At 408, the service is classified into high cloud ready, moderate cloud ready and limited cloud ready based on analyzed information at step 406. The applications can also be prioritized or classified into pilot, wave 1, wave 2, wave n and not recommended applications based on CRI score, risk score and value scores determined in the analyze phase. The high cloud ready, moderate cloud ready means that these services can be easily transitioned to the cloud computing environment. However, limited cloud ready services mean that they are not suitable for cloud computing environment, unless remediation measures are taken on parameters as identified by equations (xii) . . . (xiv).

Figure 5:
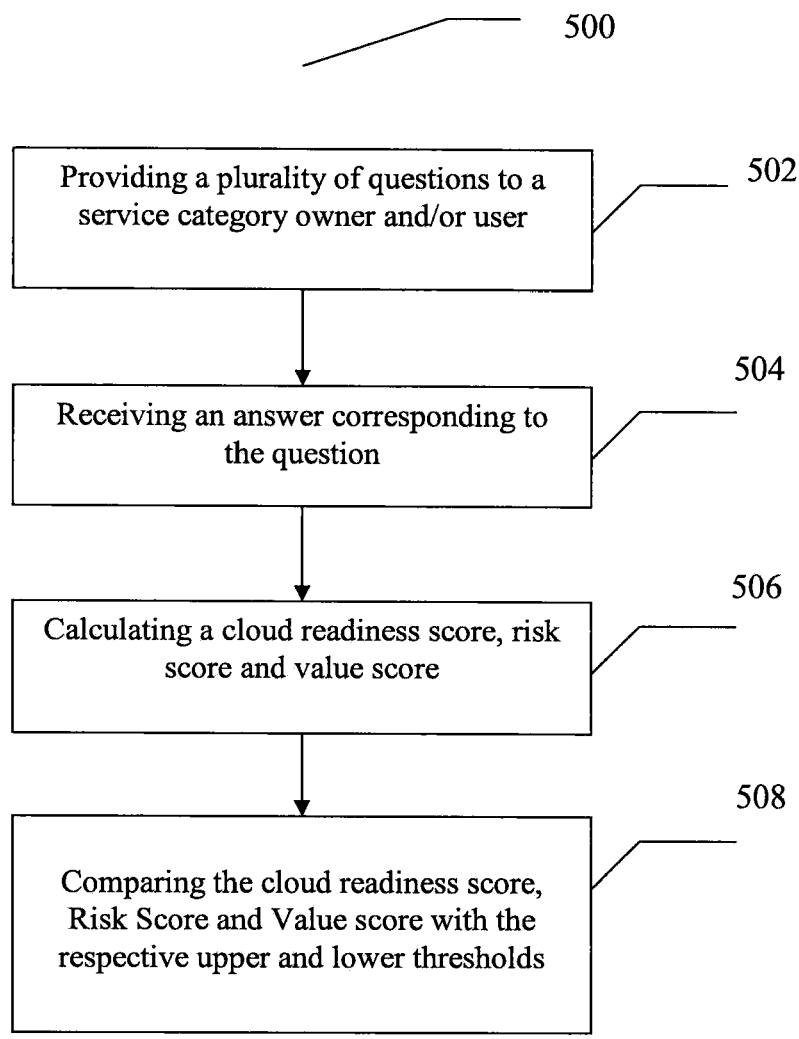
FIG. 5 is an exemplary flowchart illustrating analyzing phase of the method according to the present disclosure.

FIG. 5 is an exemplary flowchart 500 illustrating analyzing phase of the method according to an embodiment of the present disclosure.

At 502, plurality of questions relating to each pre-defined parameter can be provided to the service category owner and/or user. The questions can be used to determine the environment of the computing component, the operating system used by the computing component etc. Each question and the parameter have a pre-determined or a dynamic weight value.

At 504, answer from a plurality of options from the service category owner and/or user corresponding to a question from the plurality of questions is received and each option defines the service characteristic which has a score value.

At 506, cloud readiness score, risk score and value score based on the score value of each answer and the weight value of each question and of the parameter according to a mathematical formula as explained above is calculated.

At 508, cloud readiness score, risk score and value score are compared with dynamic lower and upper threshold value for the scenario to determine the category of services that can be transitioned to the cloud computing environment.

The advantages possessed by the present disclosure is that system and method of the instant disclosure provides a unique, fast, efficient, highly automated and comprehensive framework based on a mathematical model which provides for very high level of configurability at each level (Questions, Parameters, Defaults and Threshold Values) that are useful in aligning with the organization's imperatives, business needs and demands.

The embodiments described above and illustrated in the figures are presented by way of example only and are not intended as a limitation upon the concepts and principles of the present invention. Elements and components described herein may be further divided into additional components or joined together to form fewer components for performing the same functions. As such, it will be appreciated by one having ordinary skill in the art that various changes in the elements and their configuration and arrangement are possible without departing from the spirit and scope of the present invention as set forth in the appended claims.

We claim:

1. A method for determining a transition to a cloud computing environment, said method comprising the steps of:
   identifying at least one category of service in an organization to be transitioned to a cloud computing environment;
   collecting relevant information about the category from one or more service category owners and/or users;
   analyzing the information received based on pre-defined parameters, further comprising the sub-steps of:
      providing a plurality of questions relating to each pre-defined parameter to the service category owner and/or user, wherein each question and the parameter has a pre-determined or a dynamic weight value;
      receiving an answer from a plurality of options from the service category owner and/or user corresponding to a question from the plurality of questions, each option defining the service characteristic and having a score value;
      calculating a cloud readiness score, risk score and/or value score based on the score value of each answer and the weight value of each question and of the parameter according to a pre-defined criteria; and
      comparing the cloud readiness score, risk score and/or value score with a dynamic lower threshold value and a dynamic upper threshold value to determine the category of service that can be transitioned to the cloud computing environment; and
   classifying the services into high cloud ready, moderate cloud ready or limited cloud ready based on the analyzed information.

2. The method as claimed in claim 1, further comprising the step of prioritizing the classified services into pilot, wave 1, wave 2, wave n or unfeasible services.

3. The method as claimed in claim 1, wherein the category of service comprises of organization's applications, infrastructure or computing platforms.

4. The method as claimed in claim 1, wherein the relevant information comprises of characteristics of at least one of organization's people, processes, tools, servers, network, data, storage or applications.

5. The method as claimed in claim 1, wherein the types of cloud computing environment comprises of public, private, community or hybrid.

6. The method as claimed in claim 1, wherein the score value of each answer is dynamic and is determined by the service characteristics and cloud computing environment characteristics.

7. The method as claimed in claim 1, wherein said method provides segregation of influential parameters to determine the transitioning to the cloud computing environment.

8. A system for determining a transition to a cloud computing environment, said system comprising:
   means for identifying at least one category of service in an organization to be transitioned to a cloud computing environment;
   means for collecting relevant information about the category from one or more service category owners and/or users;
   means for analyzing the information received based on pre-defined parameters, further comprising:
      means for providing a plurality of questions relating to each pre-defined parameter to a service category owner and/or user, wherein each question and the parameter has a pre-determined or a dynamic weight value;
      means for receiving an answer from a plurality of options from the service category owner and / or user corresponding to a question from the plurality of questions, each option defining the service characteristics and having a score value;
      means for calculating a cloud readiness score, risk score and/or value score based on the score value of each answer and the weight value of each question and of the parameter according to a pre-defined criteria; and
      means for comparing the cloud readiness score, risk score and/or value score with a dynamic lower threshold value and dynamic upper threshold value to determine the service that can be transitioned to the cloud computing environment; and
   means for classifying the services into high cloud ready, moderate cloud ready or limited cloud ready based on the analyzed information.

9. The system as claimed in claim 8, further comprising the means for prioritizing the classified services into pilot, wave 1, wave 2, wave n or unfeasible services.

10. The system as claimed in claim 9, wherein the category of service comprises of organization's applications, infrastructure or computing platforms.

11. The system as claimed in claim 8, wherein the relevant information comprises of characteristics of at least one of organization's people, processes, tools, servers, network, data, storage or applications.

12. The system as claimed in claim 8, wherein the types of cloud computing environment comprises public, private, community or hybrid.

13. The system as claimed in claim 8, wherein the score value of each answer is dynamic and is determined by the service characteristics and cloud computing environment characteristics.

14. The system as claimed in claim 8, wherein said system provides a means for segregation of influential parameters to determine the transitioning to the cloud computing environment.

15. A non-transitory computer program product for determining a transition to a cloud computing environment, comprising one or more non-transitory computer readable media storing computer-executable instructions to perform a method comprising:

identifying at least one category of service in an organization to be transitioned to a cloud computing environment;

collecting relevant information about the category from one or more service category owners and/or users;

analyzing the information received based on pre-defined parameters, further comprising the sub-steps of:

providing a plurality of questions relating to each pre-defined parameter to the service category owner and/or user, wherein each question and the parameter has a pre-determined or a dynamic weight value;

receiving an answer from a plurality of options from the service category owner and/or user corresponding to a question from the plurality of questions, each option defining the service characteristic and having a score value;

calculating a cloud readiness score, risk score and/or value score based on the score value of each answer and the weight value of each question and of the parameter according to a pre-defined criteria; and comparing the cloud readiness score, risk score and/or value score with a dynamic lower threshold value and a dynamic upper threshold value to determine the category of service that can be transitioned to the cloud computing environment; and classifying the services into high cloud ready, moderate cloud ready or limited cloud ready based on the analyzed information.

* * * * *